Patented July 8, 1930

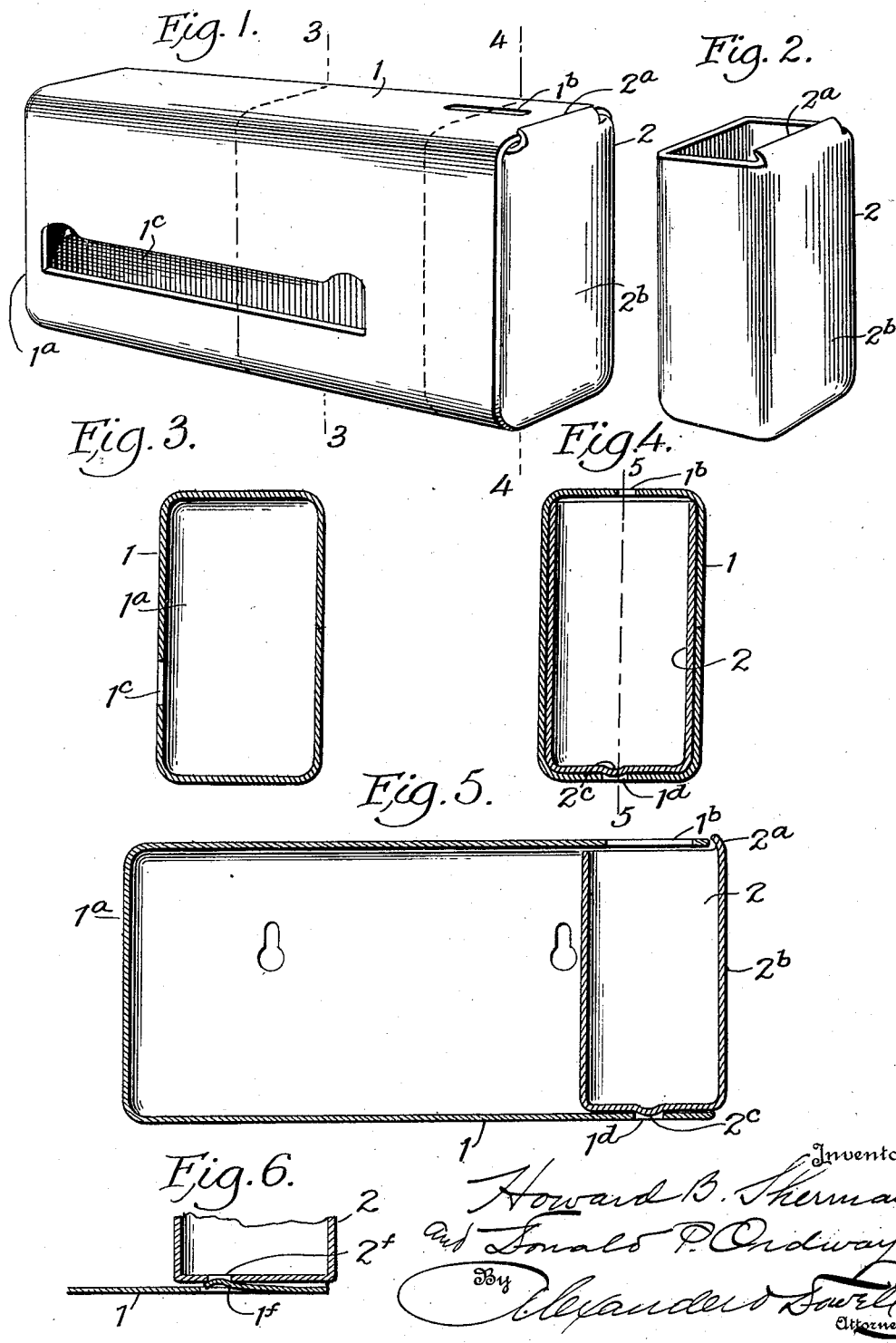

1,770,289

UNITED STATES PATENT OFFICE

HOWARD B. SHERMAN AND DONALD P. ORDWAY, OF BATTLE CREEK, MICHIGAN, ASSIGNORS TO AMERICAN STAMPING CO., OF BATTLE CREEK, MICHIGAN, A CORPORATION OF MICHIGAN

COMBINATION HOLDER FOR RAZOR BLADES AND PAPER

Application filed September 17, 1925. Serial No. 56,945.

This invention is a novel combination holder for used safety razor blades and paper for wiping such blades. Safety razor blades are usually carelessly left where they are liable to injure persons coming in contact therewith by cuts or infections, being particularly dangerous to children, servants, and housewives.

Our invention provides a novel and convenient device for holding paper wipers for razor blades, or toilet paper, and a receptacle for used safety razor blades wherein they will be kept out of the way of children or others who might be injured thereby.

The accompanying drawings illustrate a practical embodiment of the invention, and we will describe the same with reference thereto, and summarize in the claims the novel features of construction and novel combinations of parts for which protection is desired.

In said drawings:—

Figure 1 is a perspective view of the combination holder.

Figure 2 is a perspective view of the blade container removed.

Figure 3 is a transverse section on the line 3—3 of Figure 1, looking to the left;

Figure 4 is a similar section on the line 4—4, Figure 1, looking to the right.

Figure 5 is a vertical section on the line 5—5, Figure 4.

Figure 6 is a detail.

As shown, the holder comprises an oblong casing 1 which may be made of sheet metal and preferably resembles a flattened tube, substantially rectangular in cross section. One end of this casing may be closed by a plate $1^a$ which may be soldered or otherwise attached to the body of the casing. The other end of the casing is open. In the top of the casing adjacent its open end is a slot $1^b$ for the introduction of used razor blades. In the front end of the casing is an elongated slot $1^c$ through which paper may be withdrawn from the casing.

Fitted into the open end of the casing 1 is a removable blade container 2 which may be made of sheet metal, and corresponds in vertical cross section to the interior cross section of the casing 1. Said container is preferably closed at bottom and open at top, and is provided on its upper end and outer side with a projecting lip $2^a$ adapted to abut against the end of the top wall of the casing 1 when the container is inserted therein to arrest the container when it is in the proper position, and this lip also provides a convenient means whereby the container may be removed from the casing. The container may be detachably retained in the casing by any suitable means. As shown in Figure 5 it is provided with a tit $2^c$ on its bottom which is adapted to engage a hole or recess $1^d$ in the bottom of the casing adjacent the open end, the bottom of the container or casing being sufficiently resilient to permit the tit to yieldingly engage the hole $1^d$ under pressure, and to permit the container to be readily disengaged from the casing when it is desired to remove it therefrom.

When the container 2 is in place its outer wall $2^b$ forms the outer end wall of the casing 1. When the container is in position in the casing as in Figures 1, 4 and 5, the open upper end of the container is under the slot $1^b$ in the casing so that blades inserted in the slot will fall into the container. The container can be readily removed at any time it is desired to discharge the used blades therefrom. The container can be also removed when it is desired to insert paper in the casing.

In the construction shown the space in the casing between the container 2 and end wall $1^a$ forms a paper holding chamber in which may be placed a roll or book of sheets of paper such as are commonly used on the market. We do not wish to be limited to any particular cross sectional contour of the casing, as it may be of any desired section and adapted to hold paper in book form or a roll of paper of suitable size.

As shown in Figure 6 the casing might be provided with an integral or attached spring member $1^f$ at its lower side adjacent its open end adapted to engage an aperture or recess $2^f$ in the bottom of the container 2 to detachably retain the latter in position in the casing. This construction might in some instances be found preferable to the construction shown in Figure 5. We do not however wish to limit the invention to any particular means for detachably retaining the blade holding container in the casing.

The construction shown provides a compact simple combined holder for the paper and for discarded razor blades. When the container becomes filled it can be readily removed and emptied, and the blades finally disposed of. The device is very simple, and various changes may be made therein within the scope of the claims without involving invention.

We claim:

1. In a holder for used razor blades; a tubular casing open at one end and having a slot adjacent said end; and a hollow blade container corresponding in form to the cross-section of the casing and removably fitted in and closing the open end of said casing, and having an opening in its end adjacent the slot to receive blades entered through said slot.

2. In a holder for used razor blades a tubular casing opened at one end for the insertion of a blade container and having a slot adjacent said open end, and a hole adjacent the open end; and a blade container removably fitted in and closing said open end of the casing and having a tit engaging the hole to hold the container in position, and adapted to receive blades entered through said slot.

3. In a holder for blade wipers and used razor blades a casing open at one end and having a compartment for wipers adjacent one end, a slot for the removal of wipers, and also having a blade inlet slot adjacent said open end; and a blade container removably fitted in and closing the open end of said casing and adapted to receive blades entered through said slot.

4. A holder for blade wipers and used razor blades; comprising a casing open at one end, and having a compartment for wipers adjacent one end, a slot for the removal of wipers, and a blade slot adjacent its open end; and a blade container removably entered in the open end of the casing corresponding in form to the internal cross-section of the casing and adapted to receive blades entered through said slot; and means for yieldably retaining the container in the casing.

In testimony that we claim the foregoing as our own, we affix our signatures.

HOWARD B. SHERMAN.
DONALD P. ORDWAY.